United States Patent [19]

Mills et al.

[11] Patent Number: 5,969,718
[45] Date of Patent: *Oct. 19, 1999

[54] METHOD AND APPARATUS FOR PROVIDING A SOFTKEY PROMPTED USER INTERFACE

[75] Inventors: Jeffrey S. Mills, Santa Clara, Calif.; Stewart Thoeni, Carson City, Nev.

[73] Assignee: Elsag International N.V., Amsterdam, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/720,361

[22] Filed: Sep. 27, 1996

[51] Int. Cl.⁶ .................. G09G 3/00; G06F 3/14
[52] U.S. Cl. .............. 345/348; 345/172; 345/352; 345/334
[58] Field of Search .................... 395/680, 685; 345/168, 170, 172, 178, 334, 349, 902

[56] References Cited

U.S. PATENT DOCUMENTS

| | | | |
|---|---|---|---|
| 4,507,745 | 3/1985 | Agrawal | 708/134 |
| 4,551,717 | 11/1985 | Dreher | 345/170 |
| 4,823,311 | 4/1989 | Hunter et al. | 345/172 X |
| 4,845,652 | 7/1989 | Bunsen | 708/144 |
| 5,181,029 | 1/1993 | Kim | 345/172 X |
| 5,486,846 | 1/1996 | Comer et al. | 345/168 |
| 5,530,961 | 6/1996 | Janay et al. | 345/334 |
| 5,544,316 | 8/1996 | Carpenter et al. | 395/680 |

OTHER PUBLICATIONS

Yokogawa, Instruction Manual–Model SC200, 2nd Ed., Aug. 1991, The Netherlands.
Yokogawa, Instruction Manual–Model IC200, 1st Ed., Aug. 1993, The Netherlands.
Bailey Fischer & Porter, Condensed Instrumentation Catalog, p. 6–30—TB7 Unit.

Primary Examiner—Raymond J. Bayerl
Assistant Examiner—Chadwick A. Jackson
Attorney, Agent, or Firm—Michael M. Rickin

[57] ABSTRACT

A custom segment that includes softkey prompts which are included as icons in the display. A number of keys are associated with the display. Several functions are assigned to the same key. The prompts that must be displayed for each function so that the operator or user of the device in which the display is used could easily operate the keys to obtain those functions were identified at the start of the device design effort. The prompts were assigned to the keys in a logical manner so that in each state of each operating mode of the device an easy to understand set of prompts appear on the display.

19 Claims, 5 Drawing Sheets

METHOD AND APPARATUS FOR PROVIDING A SOFTKEY PROMPTED USER INTERFACE

FIELD OF THE INVENTION

This invention relates to custom segment liquid crystal display(s) (LCDs) that are part of the interface between a user and the apparatus which includes the display and more particularly to softkey prompts which are included as a permanent feature in the display.

DESCRIPTION OF THE PRIOR ART

It is now quite common for many types of equipment used in home, commercial or industrial applications to include a video display and input devices such as dials or keys. Some examples of such equipment are video cassette recorders, televisions, stereo equipment, compact disc players, appliances, instrumentation, medical treatment devices, etc. The devices that may be used by the operator or user of the equipment to remotely interface with the equipment may also include a video display and input devices.

The video display and input devices allow the user or operator of the equipment to interface, that is interact, with the equipment. The video display allows the user or operator to obtain information about the function the equipment is either then performing or will perform. The input devices allow the user or operator to enter information into the equipment which will affect either the function the equipment is then performing or will perform.

Problems common to the design of such equipment may include:

1. a space limitation on the size of the display (this limitation may arise, for example, by the desire for the equipment in which the display and input devices are used to meet the size set forth in a standard in the industry or application in which the equipment is to be used);
2. a space limitation on the number of input devices (this limitation may arise not only from the desire to have the equipment size meet a standard as described above but also from the desire to avoid having the size of input devices be such that the user or operator may accidently press or operate two such devices when it is desired to operate only one such device);
3. a multiplicity of functions that may have to be supported by the limited number of input devices (the equipment may have one or more operating modes each of which may have one or more operating states thereby requiring that one or more of the input devices serve one or more different functions);
4. a limitation on the amount of power available to operate the equipment and therefore the display.

It may in such equipment be highly desirable for the input devices to be located adjacent to the video display. Such a location should make it easier for the operator or user to use the display and input devices provided that the particular function served by each of the input devices can be clearly and unambiguously communicated to the user or operator.

This communication requirement becomes more critical when the space available on the display for communicating the functionality served by each of the input devices is limited. The criticality of this communication requirement further increases when the equipment has a number of operating modes and each such mode may have a number of states thereby requiring that one or more of the input devices serve one or more different functions. Therefore, prior art solutions such as:

1. writing the function served by each input device on or adjacent to the device; or
2. using a type of video display that requires that the displayed identifier, known as a prompt, for the functionality served by an adjacent input device must be a full graphic display (the use of a prompt on the display for identifying the functionality of an adjacent input device is known as a "softkey"); or
3. locating the keys close together and thus allowing for more keys and having a device where a user or operator may accidently press two keys;

cannot be used in designing an interface that must meet some or all of the requirements set forth above.

One example of such a prior art solution is the display and input devices in the form of keys used by Yokogawa Electric Corporation in its inductive conductivity transmitter, Model IC200G. Each of the keys has a preassigned function which is written above each key. The size of the keys and instrument enclosure are such that an operator or user of the Yokogawa transmitter may accidently depress two keys simultaneously when it is desired to depress only one key.

The Yokogawa IC200G uses a custom LCD that has a 3½ digit numeric field, a six character alpha-numeric field, and various alarm and programming icons. The numeric field, which is the primary display, is used to display the primary measurement variable. The character field, which is the secondary display, is used to display secondary measurement variables and characters that act as text to provide supportive feedback when setting, that is, configuring, instrument functions or interrogating instrument status.

The programming icons include YES, NO, up arrow, right arrow, ENTER, and a series of "menu pointer flags" which point to screen printed text next to the LCD and tell the user the programming mode of the instrument. There are six keys available to the user of the instrument. Each of the six keys is assigned to one of the six programming icons. The instrument includes a seventh key which is hidden from the user. The seventh key allows access to higher level functions not required during the normal modes of operation of the instrument.

The normal modes of operation include MEASURE, CAL, that is, calibration, DISPLAY and HOLD. The user can move from the MEASURE mode of operation to the CAL mode of operation by pressing the MODE key. This move to the CAL mode is accompanied by the blinking of the YES and NO icons, the abbreviation "CAL" appearing in the character string field, and the movement of the mode flag indicating arrow from MEASURE to CAL. If the user presses the YES key, the instrument enters the CAL mode.

In each mode of operation the text in the character string field and flashing icons steps the user through various decision points. The use of the YES and NO keys moves the user past these decision points. When numeric data is needed such as a calibration value, the right and up arrow icons, ENT icon, and numeric field begin flashing. These actions are instructing the user to use those keys to initiate the desired action.

An instrument design for use in process measurement and control whose video display and input devices met all of the requirements described above was desired. Such an instrument was designed by using the dedicated segment display of the present invention and a row of four keys adjacent to one edge of the display. The four keys were not assigned a specific function and were left undefined.

As will be described in more detail hereinafter, the functions associated with each of the keys and the prompts that must be displayed for each function so that the operator or user of the instrument could easily use the display and keys to obtain those functions were identified at the start of the design effort. The prompts were then assigned to the keys in a logical manner so that in each state of each operating mode of the instrument an easy to understand set of prompts appear on the display.

By multiple assignment of functions to a single key, less keys are required to implement the same functionality. Hence the space occupied by interfaces of the prior art is larger than the space occupied by the interface of the present invention. This space savings can then be used to provide improvements such as a larger display for easier viewing.

The dedicated segment display gives higher contrast and better readability within the given size, approximately, 2" (about 51 mm) by 3" (about 76 mm) than displays of the same size previously used for such instruments. One such prior art display is the full graphic glass used in the TB7 µFACT series of Analytical Controlling Transmitters, which is manufactured and sold by the Assignee's TBI-Bailey Controls operating unit. The display used therein is an 80×80 (6400 dots) segment display with a 1/40 level drive, which means that each pixel in the display is energized only 1/40 of each cycle and glows for 39/40 of the cycle. Another such prior art display is the four line character display used in the STT02 smart transmitter terminal which is also sold by TBI-Bailey Controls. The display used therein is a 32×160 (5120 dots) with a 1/16 level drive.

In comparison to the above described displays, the dedicated segment display of the present invention has 146 segments and a 1/4 level drive. Such a display provides a large size for the display of the main or primary variable that is being measured by the instrument, readability of small icons, overall better contrast and lower power draw than the above described displays.

SUMMARY OF THE INVENTION

The present invention is embodied as a display for use in an apparatus. The apparatus has a plurality of operating modes and a keypad which has at least one key which does not have a fixed preset function for operating the apparatus when the key is actuated. A function is assigned to the key depending on which of the plurality of operating modes the apparatus is in.

The display has one dedicated segment display for providing information associated with and external to said one key. The dedicated segment display has predetermined information permanently therein in the form of at least two lightable messages. Each of the messages when lit appear as an icon in the display indicative of functionality assigned to the one key. A message in the one dedicated segment display is only lit and appears as the icon when the apparatus is in that one of the plurality of operating modes that corresponds to the function assigned to the one key.

The present invention is also embodied as a display for use in an apparatus. The apparatus has a plurality of operating modes and a keypad which has a plurality of keys. None of the keys have associated therewith a fixed preset function for operating the apparatus when actuated. A function is assigned to each of the keys depending on which of the plurality of operating modes the apparatus is in.

The display has a plurality of dedicated segment displays each for providing information and each having information permanently therein as at least one lightable and predetermined message. The message when lit appears as an icon in the display indicative of functionality assigned to the plurality of keys. Each of the dedicated segment displays are associated with and external to a respective one of the plurality of keys. A message in any one of the plurality of dedicated segment displays is only lit and appears as the icon when the apparatus is in that one of the plurality of operating modes that corresponds to the function assigned to the associated one of the plurality of keys.

The present invention is further embodied as an apparatus which has a plurality of operating modes. The apparatus has a keypad which has a plurality of keys none of which have associated therewith a fixed preset function for operating the apparatus when actuated. Each of the keys has a function assigned depending on which of the plurality of operating modes the apparatus is in.

The display also has a plurality of dedicated segment displays each for providing information and each having information permanently therein as at least one lightable and predetermined message. The message when lit appears as an icon in the display indicative of functionality assigned to and external to the plurality of keys. Each of the dedicated segment displays are associated with a respective one of, the plurality of keys. A message in any one of the plurality of dedicated segment displays is only lit and appears as an icon when the apparatus is in that one of the plurality of operating modes that corresponds to the function assigned to the associated one, of the plurality of keys.

The present invention is embodied as a method for creating a display for use in an apparatus. The apparatus has a plurality of operating modes and a keypad. The keypad has at least one key which does not have a fixed preset function for operating the apparatus when actuated.

The method includes the step of assigning to the at least one key a function for operating the apparatus depending on which of the plurality of operating modes the apparatus is in. The method further includes the step of including in the display one dedicated segment display for providing information associated with and external to the one key. The one dedicated segment display has information permanently therein as at least two lightable and predetermined messages each of which when lit appear as an icon in the display indicative of functionality assigned to the one key. A message in the one dedicated segment display is only lit and appears as the icon when the apparatus is in that one of the plurality of operating modes that corresponds to the function assigned to the one key.

The present invention is also embodied as a method for creating a display for use in an apparatus. The apparatus has a plurality of operating modes and a keypad. The keypad has a plurality of keys none of which have associated therewith a fixed preset function for operating the apparatus when actuated.

The method includes the step of assigning to each of the keys a function for operating the apparatus when actuated depending on which of the plurality of operating modes the apparatus is in. The method further includes the step of including in the display a plurality of dedicated segment displays each for providing information and each having information permanently therein as at least one lightable and predetermined message which when lit appears as an icon in the display indicative of functionality assigned to the plurality of keys. Each of the dedicated segment displays associated with and external to a respective one of the plurality of keys. A message in any one of the plurality of dedicated segment displays being only lit and appearing as an icon when the apparatus is in that one of the plurality of operating modes that corresponds to the function assigned to the associated one of the plurality of keys.

DESCRIPTION OF THE PREFERRED EMBODIMENT(S)

Figure 1:
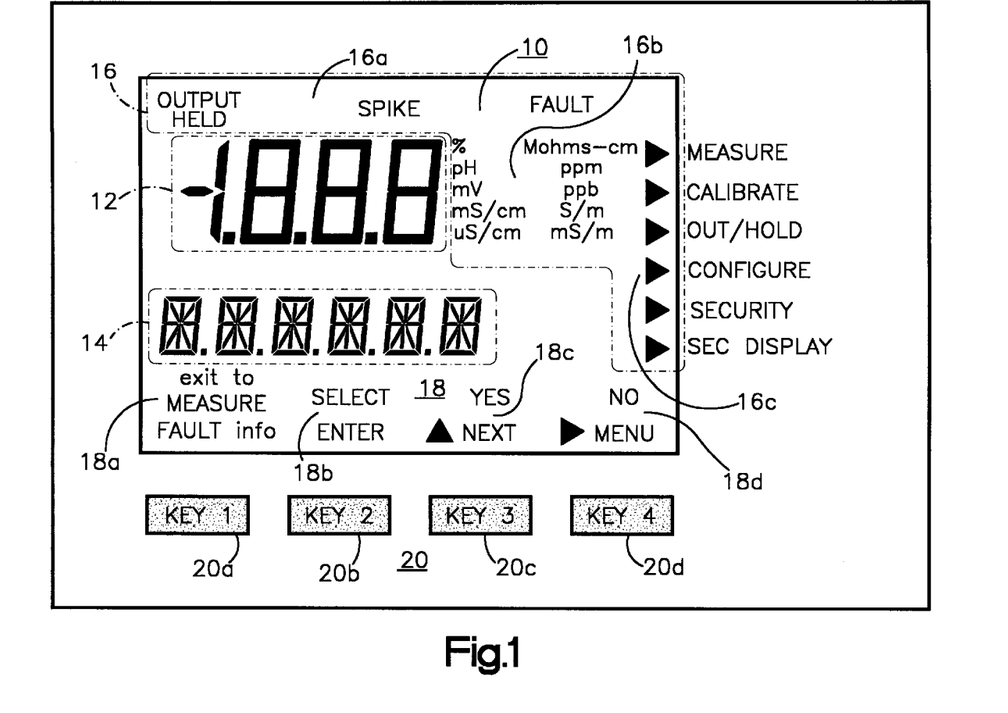
FIG. 1 shows a dedicated segment display implemented in accordance with the present invention.

Referring now to FIG. 1, there is shown a dedicated segment display 10 implemented in accordance with the present invention. The display has an area 12 wherein is displayed the primary variable (PV) using large characters each of which has seven segments. The display also has a six character area 14 wherein is displayed the secondary variable or textual prompting using smaller characters each of which has fourteen segments. The display further has an area 16 wherein the fault/hold icons 16a, the units icons 16b and the mode indicators 16c are displayed. Finally, the display has an area 18 wherein the icons for the softkey prompts of the present invention are displayed.

As is shown in FIG. 1, the softkey prompt icons area 18 is comprised of four groups, 18a to 18d, of icons. Group 18a has the icons "exit to MEASURE" and "FAULT info"; 18b has the icons "SELECT" and "ENTER"; 18c has the icons "YES", "NO" and the up arrow; and 18d has the icons "NO", "MENU", and the right arrow.

The instrument in which display 10 is used includes keypad 20 which has four keys 20a to 20d. Each of the icon groups is physically located close to an associated one of the four keys 20a, 20b, 20c, and 20d. Group 18a is close to and associated with key 20a, group 18b is close to and associated with key 20b, group 18c is close to and associated with key 20c, and group 18d is close to and associated with key 20d.

In designing the instrument the keys were not assigned a specific function and were left undefined. Each icon in a group is a textual or graphic description of a particular function served by the associated key when that icon is lit. The functions associated with each of the keys and the prompt icon that must be displayed for each such function were identified at the start of the design effort for the instrument. The icons were then assigned to the keys in a logical manner. The functions represented by each of the icons will be described in more detail below in connection with FIGS. 2a to 2f.

The instrument in which the display 10 is used has six operating modes. The modes are MEASURE, CALIBRATE, OUT/HOLD, CONFIGURE, SECURITY, and DISPLAY. The function of each mode is described in the table below.

| Mode | Function |
| --- | --- |
| MEASURE | used to display the process and secondary variables - normal operating mode of the instrument |
| CALIBRATE | used to calibrate the instrument |
| OUT/HOLD | used for on-line tuning of output parameters or to manually control the output, for example, during instrument maintenance |
| CONFIGURE | used to configure the instrument |
| SECURITY | used to enter password protection |
| DISPLAY | used to select the variable to be displayed in area 14 when instrument is in MEASURE mode |

In each of the six operating modes, each of the keys 20a to 20d may have a different meaning depending on which functions are used in that mode. Not all of the keys are used in each mode. The instrument lights the appropriate icons that are used in any particular mode.

Since the MEASURE mode is the normal operating mode of the instrument it was decided in designing the instrument that the same key in all of the other operating modes should when pressed return the instrument to the MEASURE mode. This provides the user with an escape function. Key 20a was selected to perform that function and the "exit to MEASURE" softkey prompt icon of group 18a was assigned to that key. Therefore, that icon is lit when the instrument is in other than the MEASURE mode and any other icon in group 18a can only be lit when the instrument is in the MEASURE mode.

If there is a diagnostic or a fault condition has been detected in the process which the instrument is measuring one or more of the fault/hold icons 16a will be lit. The instrument can only display information about the diagnostic or fault condition when it is in the MEASURE mode. Therefore, since group 18a can have other icons in addition to the "exit to MEASURE" icon as long as those icons are only used in the MEASURE mode, it was decided to assign the "FAULT info" icon to group 18a. That icon will be lit only when the instrument is in the MEASURE mode and one of the fault only (i.e., FAULT and SPIKE) icons in area 16a is lit. The "FAULT info" icon prompts the user to press key 20a if the user desires to view information about the fault condition.

Figure 2A:
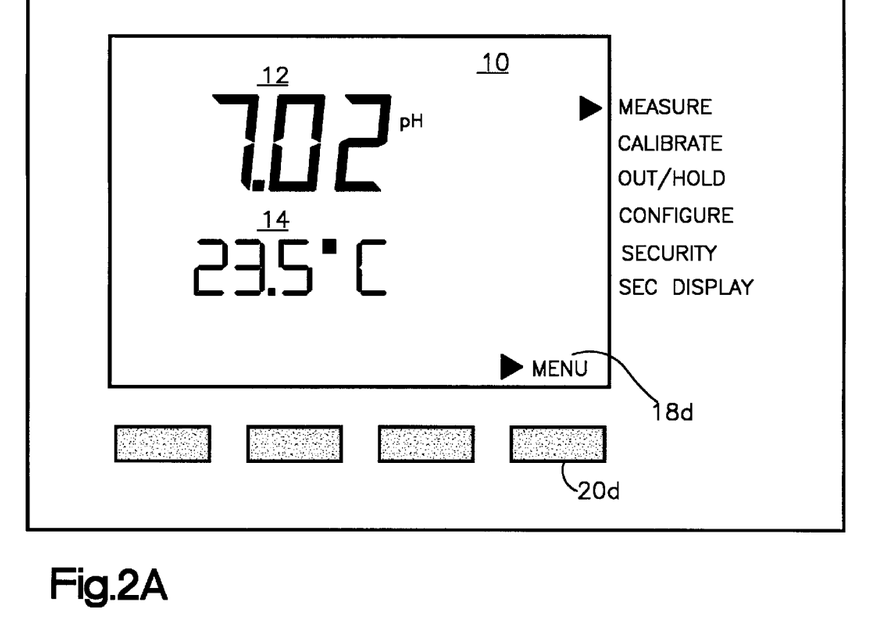
FIGS. 2a to 2f show the display as it would appear in the various operating modes of the instrument along with the softkey prompt icons that are used in that mode.

Referring now to FIGS. 2a to 2f, there is shown display 10 as it appears in the various operating modes of the instrument along with the softkey prompt icons that are used in that mode. As was described above, the MEASURE mode is the normal mode of operation of the instrument and FIG. 2a shows the display in that mode. In this embodiment the instrument is being used to measure the pH of a solution as the primary PV and that measurement appears in area 12 on the display. The secondary variable measured by the instrument is the temperature of the solution in degrees Celsius and that variable is displayed in area 14.

When the instrument is in the MEASURE mode of operation the user has the capability to scroll through the other operating modes to thereby select one of those modes. Therefore, in the MEASURE mode a softkey prompt icon must be lit that prompts the user to press one of the keys 20a to 20d to scroll through the other modes. That icon is the "MENU" icon and since it was decided in designing the instrument that key 20d should be associated with the scrolling function, the MENU icon was assigned to group 18d. Thus, the MENU icon is lit as is shown in FIG. 2a when the instrument is in the MEASURE mode.

The MENU icon prompts the user to press key 20d to thereby scroll through the operating modes of the instrument. Of course, if a fault condition had occurred and the instrument was still in the MEASURE mode, one of the icons in area 16a would be lit and the softkey prompt icon "FAULT info" would also be lit in group 18a.

Figure 2B:
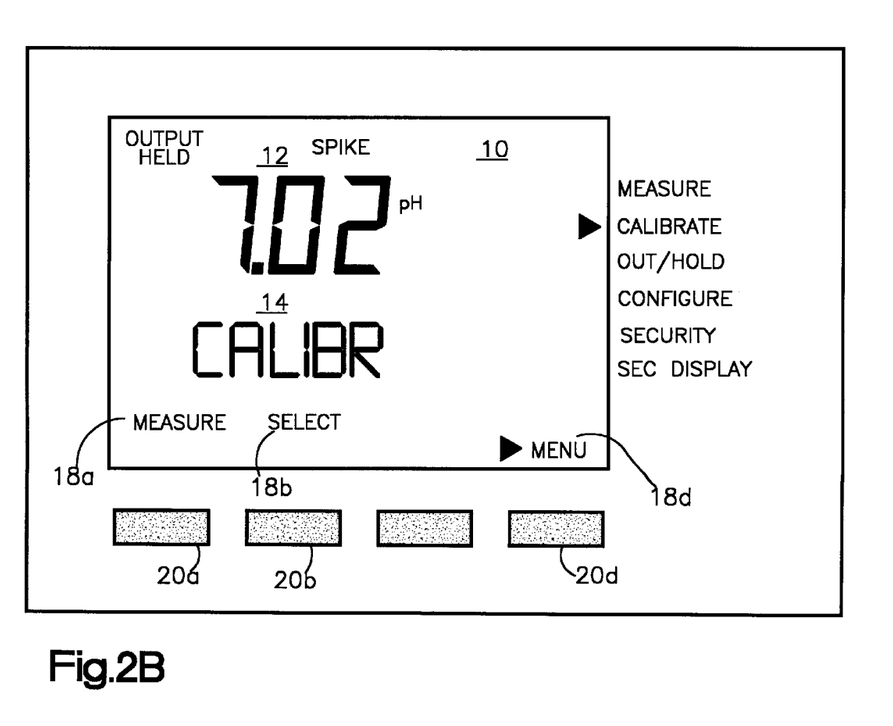

Referring now to FIG. 2b, there is shown the display 10 when the instrument is in the CALIBRATE mode of operation. In this mode, the PV is displayed in area 12 and area 14 displays the letters CALIBR to remind the user that the instrument is in the CALIBRATE mode.

As can be seen in FIG. 2b, the "exit to MEASURE" icon in group 18a and the "MENU" icon in group 18d are both lit in the CALIBRATE mode of operation. The exit to MEASURE icon prompts the user to press key 20a, if the user wants the instrument to return to the MEASURE mode. The MENU icon prompts the user to press key 20d, if the user wants the instrument to proceed to the next mode of operation, which in this embodiment is the OUT/HOLD mode.

The CALIBRATE mode of operation allows the user to calibrate various parameters measured by the instrument and therefore has a number of states. Thus, one of the keys 20a to 20d must be associated with the function which allows the user to select the CALIBRATE mode of operation. In designing the instrument in which display 10 is used, it was decided to use key 20b for that function.

Once it was decided to use key 20b for the selection of the CALIBRATE mode, an appropriate icon had to be included in group 18b to prompt the user to press that key if the user desired to select the CALIBRATE mode. That icon is the "SELECT" icon. The SELECT icon is lit in the CALIBRATE mode and prompts the user to press key 20b if the user wants to select that mode of operation. Pressing key 20b causes the instrument to proceed the first level for all of the states in the CALIBRATE mode.

Figure 2C:
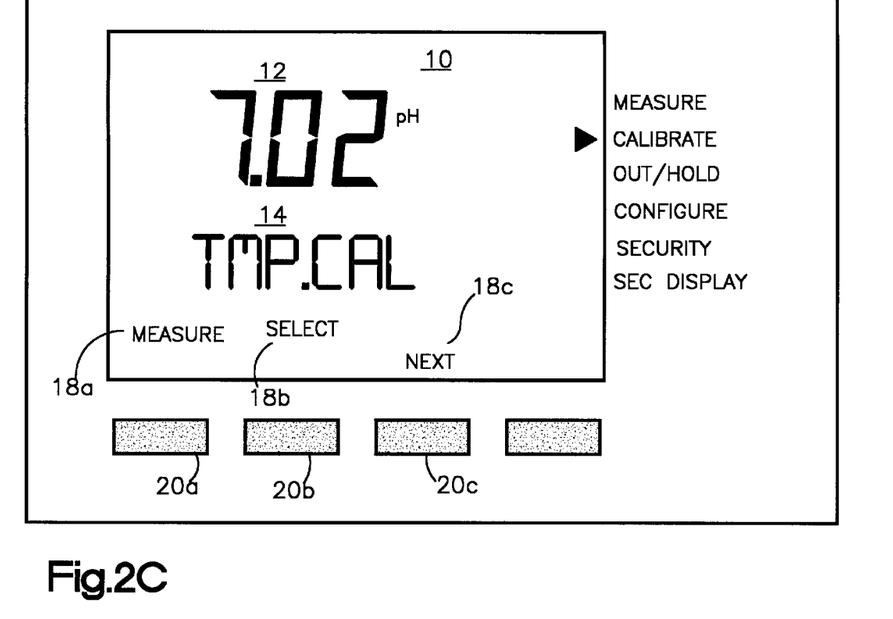

Referring now to FIG. 2c, there is shown the display 10 when the instrument is in the temperature calibration state of the CALIBRATE operating mode. The temperature calibration state is one of several calibration states in the CALIBRATE mode of operation. Area 12 still shows the pH as that is the PV that the instrument is measuring. Area 14 shows "TMP.CAL" as a reminder to the user that the instrument is in the temperature calibration state. The icon of group 18a that is displayed is still "exit to MEASURE" as that icon will always appear as the only lit icon in group 18a when the instrument is in other than the MEASURE mode. The icon lit in group 18b is still "SELECT" as it is prompting the user to choose the temperature calibration state.

As was stated above there are several other calibration states at the first level of the CALIBRATE mode of operation in addition to the temperature calibration state. Therefore, one of the keys 20a to 20d must be associated with the function which allows the user to proceed to the next calibration state in the CALIBRATE mode. In designing the instrument in which display 10 is used, it was decided to use key 20c for that function.

Once it was decided to use key 20c to allow the user to proceed to the next calibration state, an appropriate icon had to be included in group 18c to prompt the user to press that key if the user desired to proceed to the next state in the CALIBRATE mode. That icon is the "NEXT" icon. Thus, the NEXT icon is dedicated to environments within a mode. The NEXT icon is the prompt to the user to use key 20c to pick the next state in this level if the user does not want to calibrate the temperature, but wants to calibrate another parameter.

Figure 3:
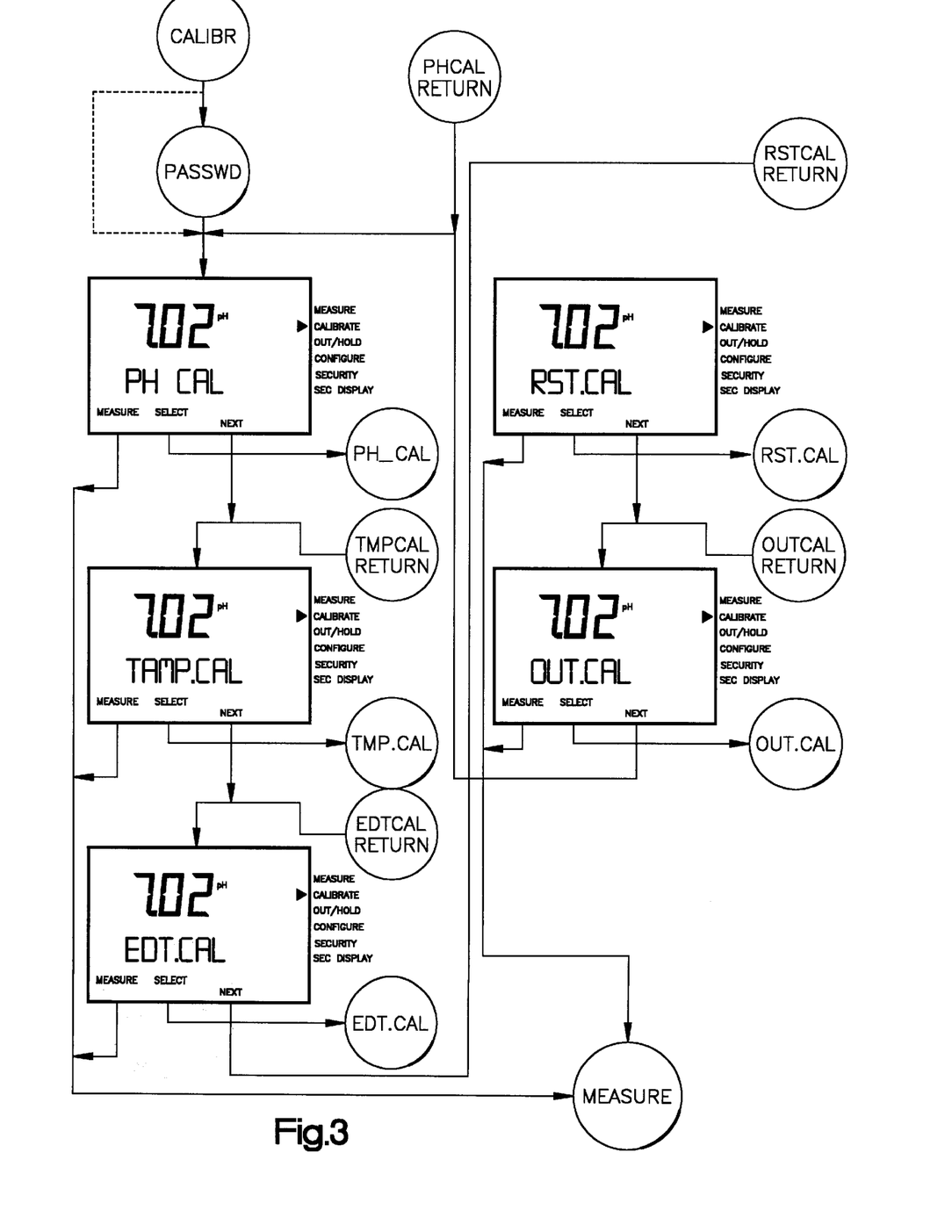
FIG. 3 shows a flowchart of the calibration states at the first level of the CALIBRATE mode of operation in the instrument in which the display is used.

Referring momentarily to FIG. 3, there is shown a flowchart of the calibration states at the first level of the CALIBRATE mode of operation in the instrument in which display 10 is used. The instrument has five calibration states in addition to the TMP.CAL state. The PH CAL state allows the user to calibrate the PV, which in this embodiment is the pH. The EDT.CAL state allows the user to manually edit the calibration data for the PV. The RST.CAL state allows the user to reset the calibration of the instrument to the original factory calibration. The OUT.CAL allows the user to calibrate the analog output of the instrument.

It should be noted that since the instrument is at the first level of the CALIBRATE mode, the "MENU" icon is not lit in FIG. 2c. Key 20d is not operational at the first level of the CALIBRATE mode as the user has previously decided to select one of the operating modes of the instrument. In order for the user to return to scrolling through the modes of instrument operation, the user must use key 20a to return to the MEASURE mode. Therefore, the MENU icon is dedicated only to the modes.

Figure 2D:
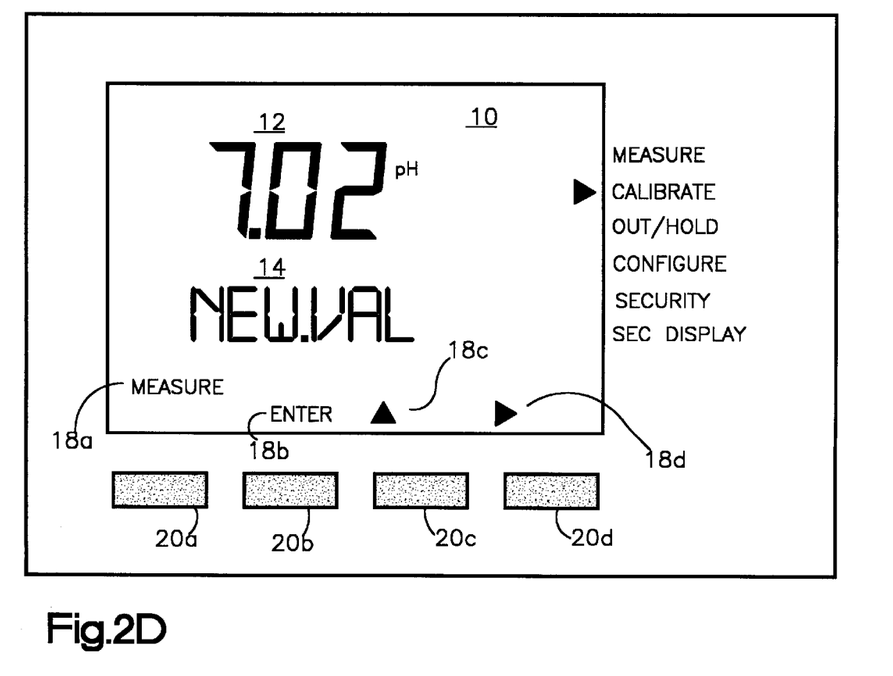

Referring now to FIG. 2d, there is shown display 10 when the instrument is at that level of the pH calibration state which allows the user to enter a new pH value. As is shown in FIG. 3, the pH calibration state is at the same level of instrument operation as the temperature calibration state. Therefore, the level associated with the display shown in FIG. 2d is below the first level of the pH calibration state.

Area 12 shows the present PV, that is, the present value for pH. Area 14 is used to remind the user that the instrument is at that level of the pH calibration state wherein a new value can be entered for the pH. As was described above, the "exit to MEASURE" icon is lit in group 18a.

The user has selected the state level of instrument operation shown in FIG. 2d in order to enter a new value for pH. Therefore, one of the keys 20a to 20d must be associated with the function which allows the user to enter the new value. In designing the instrument in which display 10 is used it was decided to use key 20b for that function.

Once it was decided to use key 20b to allow the user to enter a new value in the CALIBRATE mode for a parameter, in this example pH, an appropriate icon had to be included in group 18b to prompt the user to press that key if it is desired to enter the new value. That icon is the "ENTER" icon which is now lit in group 18b. This softkey icon prompts the user that new data, namely, a new value for pH, can be entered into the instrument by pressing key 20b.

As can be seen from a comparison of FIGS. 2b and 2c with FIG. 2d, the softkey prompt icons in group 18b are "SELECT" and "ENTER." It should be appreciated from the description above for FIGS. 2b and 2c and the description immediately above for FIG. 2d that the SELECT icon prompts the user of the instrument to press key 20b to select either one of the operating modes of the instrument or choose the state shown in the display whereas the ENTER icon prompts the user to press key 20b to enter new data into the instrument.

In order for the user to enter a new value for pH the user must have the ability to change each of the digits shown in the display for the PV. Therefore, one of the keys 20a to 20d must be associated with changing, that is, incrementing, the value of each digit and another of the keys must be associated with moving between the digits. In designing the instrument in which display 10 is used it was decided to use key 20c to increment the value of a digit and key 20d to move between the digits.

Once it was decided to use key 20c to allow the user to change the value of a digit an appropriate icon had to be included in group 18c to prompt the user to press that key if it was desired to change the value of a digit. That icon is the up arrow softkey icon which is now lit in group 18c to prompt the user that the new pH value can be entered for each digit by using key 20c.

Once it was decided to use key 20d to allow the user to move between the digits an appropriate icon had to be included in group 18d to prompt the user to press that key if it was desired to move between the digits. That icon is the right arrow softkey icon which is now lit in group 18d to prompt the user that key 20d can be used to move across the digits from left to right to thereby select the digit to be changed.

Figure 2E:
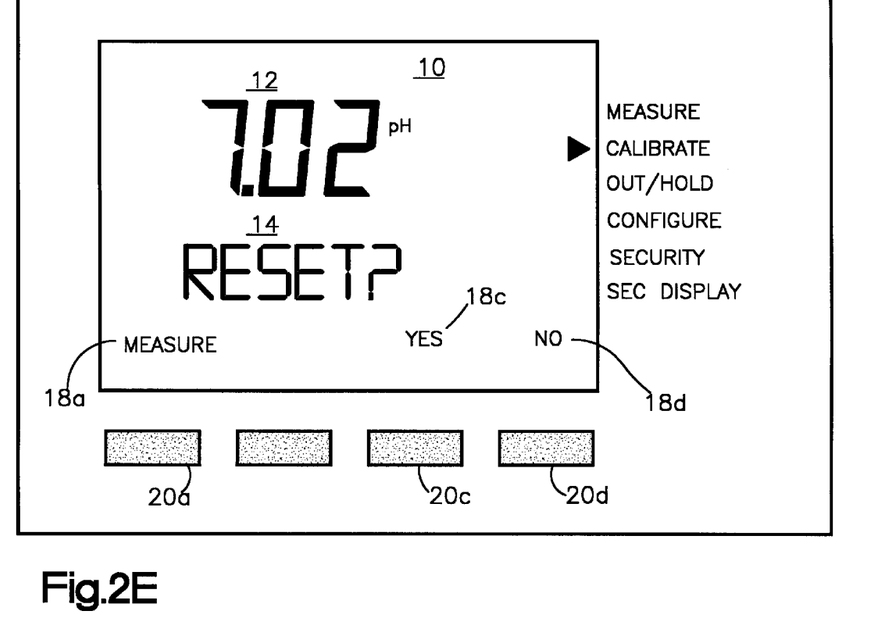

Referring now to FIG. 2e, there is shown display 10 when the instrument is at that level of the reset calibration (RST.CAL) state which allows the user to reset the calibration to the calibration values entered into the instrument at the factory. The reset calibration state is at the same level as the temperature calibration (TMP.CAL) and pH calibration (PH CAL) states. Therefore, the level for the display shown in FIG. 2e is below the level of the reset calibration state.

Area 12 shows the present PV, that is, the present value for pH. Area 14 is used to remind the user that the instrument is at that level of the reset calibration state wherein the user can decide if to reset or not reset the calibration values to the factory calibration values. As was described above, the "exit to MEASURE" icon is lit in group 18a.

There isn't any icon lit in group 18b as the user cannot at this level either enter a new value for the PV or select another state. The user has selected the state level of instrument operation shown in FIG. 2e as the user may desire to reset the calibration values to the factory calibration values. Therefore, one of the keys 20a to 20d must be associated with the function that allows the user to so reset the calibration values. In designing the instrument in which display 10 is used it was decided to use key 20c for that function.

Once it was decided to use key 20c to allow the user to reset the calibration values in the reset calibration state of the CALIBRATE mode of operation to the factory calibration values, an appropriate icon had to be included in group 18c to prompt the user to press that key if it was desired to so reset the calibration values. That icon is the "YES" icon which is now lit in group 18c. This softkey icon prompts the user that pressing key 20c will cause the calibration values to be reset to the factory values.

The user may not desire to reset the instrument's calibration values to the factory calibration values. Therefore, one of the keys in group 20a to 20d must be associated with the function which allows the user to not reset the calibration values to the factory values. In designing the instrument in which display 10 is used it was decided to use key 20d for that function.

Once it was decided to use key 20d to allow the user not to reset the calibration values to the factory calibration values, an appropriate icon had to be included in group 18d to prompt the user to press that key if it was not desired to so reset the calibration values. That icon is the "NO" icon which is now lit in group 18d. This softkey icon prompts the user that pressing key 20d will not reset the calibration values to the factory values. Pressing key 20d causes the instrument to return to the reset calibration state.

Figure 2F:
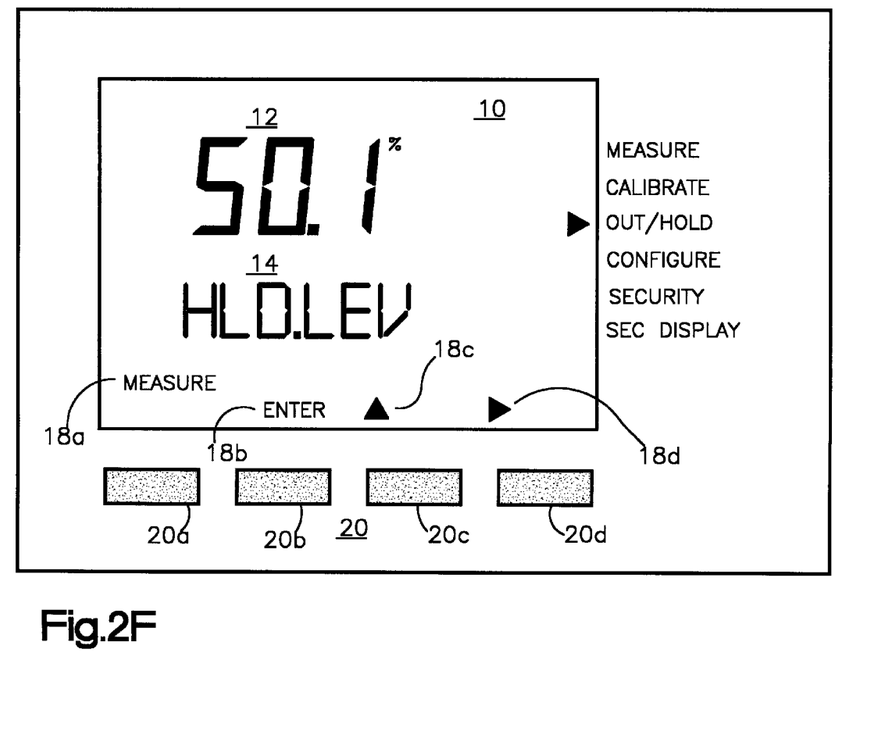

Referring now to FIG. 2f, there is shown display 10 when the instrument is at that level of the OUT/HOLD mode of operation wherein the user can enter a new value for the percentage of output signal to be held while, for example, the instrument is undergoing maintenance. Area 12 shows the percentage of signal output being sent by the instrument. The fault/hold icon "OUTPUT HELD" is lit in area 16a to inform the user that the instrument signal output is being held at either the value shown in the display or at a new value entered by the user in the manner described below.

The "ENTER" softkey icon of group 18b is lit to prompt the user to press key 20b to enter a new value for the percentage of signal output being sent by the instrument. The user has selected the state level of operation shown in FIG. 2f as the user desires to hold either the present value for the percentage of instrument signal output or a new value while the instrument is for example undergoing maintenance. Since the user can enter a new value for the percentage of signal output being sent by the instrument, one of the keys 20a to 20d must be associated with the function that allows the user to increment each digit used in the display for the percentage. In addition, one of the keys must be associated with the function which allows the user to move between the digits used to display the percentage.

As was described in connection with FIG. 2d, it was decided to use key 20c to increment the value of a digit and key 20d to move between the digits. As was described in connection with FIG. 2d, the up arrow softkey icon is included in group 18c to prompt the user to press key 20c if it is desired to increment the value of a digit and the right arrow softkey icon is included in group 18d to prompt the user to press key 20d if it is desired to move between the digits. Therefore in FIG. 2f, the up arrow softkey icon of group 18c is lit to prompt the user to use key 20c to increment the digit of the new output value and the right arrow softkey icon is lit to prompt the user to use key 20d to move across the digits of the output value from left to right to select the digit to be changed.

It should be appreciated that the appropriate icons are lit in each state level upon receipt by display 10 of a signal to light that icon. It should further be appreciated that the instrument in which the display is used will a typically include a microcontroller or equivalent which will, among other operations, provide the signaling to control the lighting of the appropriate icons for the operating mode, state and level the instrument is in. As is well known, the microcontroller will have therein a software program and those of ordinary skill in the art should from the description of the present invention given herein be able to program the microcontroller to perform the icon lighting function described above.

Figure 4:
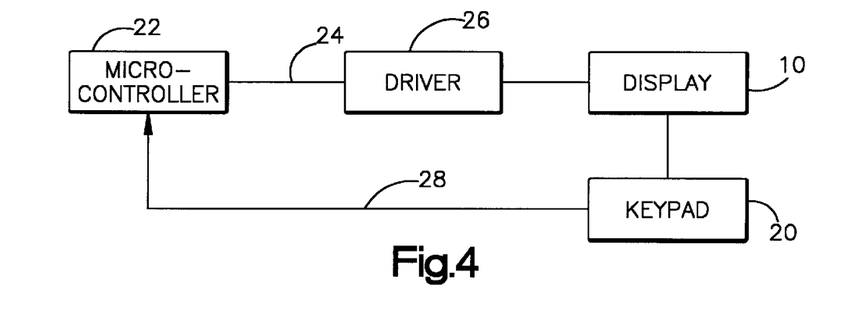
FIG. 4 is a simplified block diagram for one embodiment of the hardware used to control the lighting of the softkey prompt icons used in the display.

Referring now to FIG. 4, there is shown a simplified block diagram of one embodiment for the microcontroller and associated hardware to control the icon lighting as described above. FIG. 4 includes microcontroller chip 22 which is connected to driver chip 26 by bus 24. Chip 26 is connected to display 10. Keypad 20 is connected by bus 28 to microcontroller 22. In one specific embodiment of FIG. 4, a Hitachi 602 driver chip was used for chip 26, a Motorola 68HC11A1 microcontroller was used for chip 22, and a custom tactile keypad was used for keypad 20.

While the present invention has been described in connection with the softkey prompt icons shown in FIG. 1, it should be appreciated that groups 18a to 18d may include additional icons depending on the particular function to be provided by each of the keys 20a to 20d. Functions, and therefore icons, can be assigned to the keys provided that no ambiguity arises as a result of the assignment. In other words, in each state of each operating mode of the instrument and in each level of each state each key must have only one function.

One example of an additional key functionality, and therefore of an additional icon, is where it is desired to allow the user to change the value of a parameter by incrementing or decrementing the parameter rather than using the keys associated with the up and right arrow icons to change the value of each digit of the parameter. In that instance, one of the keys, for example 20d, would be designated to provide the function of decrementing the parameter. An appropriate icon, such as a down arrow, would be lit when the instrument is at that level of an operating mode, such as the CALIBRATE mode, wherein the user can decrement the value of the parameter. Key 20c would in that instance provide the parameter incrementing function.

It should also be appreciated that the display of the present invention is a user interface that can be used in many applications in addition to the instrument use described herein. It should further be appreciated that having keys that do not have a fixed preset function and the identification of the functionality of those keys and the assignment of softkey prompt icons to the keys in a logical manner as part of the design effort of the apparatus in which the display will be used gives the interface of the present invention the flexibility that allows it to be used in many applications.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A display for use in an apparatus, said apparatus having a plurality of operating modes and a keypad having at least one key which does not have a fixed preset function for operating said apparatus when actuated, said one key having a function assigned depending on which of said plurality of operating modes said apparatus is in, said display comprising:

one dedicated segment display for providing information associated with and external to said one key and having predetermined information permanently therein as at least two lightable messages, each of which when lit appearing as an icon in said display indicative of functionality assigned to said one key, a message in said one dedicated segment display being only lit and appearing as said icon when said apparatus is in that one of said plurality of operating modes that corresponds to said function assigned to said one key.

2. The display of claim 1 wherein at least one of said plurality of operating modes has one or more operating states and said at least one key has a function assigned when said apparatus is in said one or more operating states.

3. The display of claim 2 wherein one of said at least two lightable messages will be lit when said apparatus is in said one or more operating states.

4. The display of claim 2 wherein said one dedicated segment display his an additional lightable message therein which will be lit when said apparatus is in said one or more operating states.

5. A display for use in an apparatus, said apparatus having a plurality of operating modes and a keypad having a plurality of keys none of which have associated therewith a fixed preset function for operating said apparatus when actuated, each of said keys having a function assigned depending on which of said plurality of operating modes said apparatus is in, said display comprising:

a plurality of dedicated segment displays each for providing information and each having information permanently therein as at least one lightable and predetermined message which when lit appears as an icon in said display indicative of functionality assigned to said plurality of keys, each of said dedicated segment displays associated with and external to a respective one of said plurality of keys, a message in any one of said plurality of dedicated segment displays being only lit and appearing as said icon when said apparatus is in that one of said plurality of operating modes that corresponds to said function assigned to said associated one of said plurality of kegs.

6. The display of claim 5 wherein at least one of said plurality of operating modes has one or more operating states and one of said plurality of keys has a function assigned when said apparatus is in said one or more operating states.

7. The display of claim 6 wherein said at least one message in that one of said plurality of dedicated segment displays is associated with that one of said plurality of keys which has an assigned function when said apparatus is in said one or operating states is lit when said apparatus is in said one or more operating states.

8. The display of claim 6 wherein that one of said plurality of dedicated segment displays associated with that one of said plurality of keys which has an assigned function when said apparatus is in said one or operating states has an additional lightable message therein which is lit when said apparatus is in said one or more operating states.

9. An apparatus having a plurality of operating modes comprising:

a) a keypad having a plurality of keys none of which have associated therewith a fixed preset function for operating said apparatus when actuated, each of said keys having a function assigned depending on which of said plurality of operating modes said apparatus is in; and b) a display having a plurality of dedicated segment displays each for providing information and each having information permanently therein as at least one lightable and predetermined message which when lit appears as an icon in said display indicative of functionality assigned to and external to said plurality of keys, each of said dedicated segment displays associated with a respective one of said plurality of keys, message in any one of said plurality of dedicated segment displays being only lit and appearing as an icon when said apparatus is in that one of said plurality of operating modes that corresponds to said function assigned to said associated one of said plurality of keys.

10. The apparatus of claim 9 wherein at least one of said plurality of operating modes has one or more operating states and one of said plurality of keys has a function assigned when said apparatus is in said one or more operating states.

11. The apparatus of claim 10 wherein said at least one icon in that one of said plurality of dedicated segment displays associated with that one of said plurality of keys which has an assigned function when said apparatus is in said one or operating states is lit when said apparatus is in said one or more operating states.

12. The apparatus of claim 10 wherein that one of said plurality of dedicated segment displays associated with that one of said plurality of keys which has an assigned function when said apparatus is in said one or operating states has an additional lightable message therein which is lit when said apparatus is in said one or more operating states.

13. A method for creating a display for use in an apparatus, said apparatus having a plurality of operating modes and a keypad having at least one key which does not have a fixed preset function for operating said apparatus when actuated, said method comprising the steps of:
  a) assigning to said at least one key a function for operating said apparatus depending on which of said plurality of operating modes said apparatus is in; and
  b) including in said display one dedicated segment display for providing information associated with and external to said one key and having information permanently therein as at least two lightable and predetermined messages each of which when lit appearing as an icon in said display indicative of functionality assigned to said one key, a message in said one dedicated segment display being only lit and appearing as said icon when said apparatus is in that one of said plurality of operating modes that corresponds to said function assigned to said one key.

14. The method of claim 13 wherein at least one of said plurality of operating modes of said apparatus has one or more operating states and further comprising the step of assigning to said at least one key a function when said apparatus is in said one or more operating states.

15. The method of claim 14 further comprising the step of adding an additional lightable message which is lit when said apparatus is in said one or more operating states to said one icon group associated with said at least one key which has an assigned function when said apparatus is in said one or operating states.

16. A method for creating a display for use in an apparatus, said apparatus having a plurality of operating modes and a keypad having a plurality of keys none of which have associated therewith a fixed preset function for operating said apparatus when actuated, said method comprising the steps of:
  a) assigning to each of said keys a function for operating said apparatus when actuated depending on which of said plurality of operating modes said apparatus is in; and
  b) including in said display a plurality of dedicated segment displays each for providing information and each having information permanently therein as at least one lightable and predetermined message which when lit appears as an icon in said display indicative of functionality assigned to said plurality of keys, each of said dedicated segment display associated with and external to a respective one of said plurality of keys, a message in any one of said plurality of dedicated segment displays being only lit and appearing as an icon when said apparatus is in that one of said plurality of operating modes that corresponds to said function assigned to said associated one of said plurality of keys.

17. The method of claim 16 wherein at least one of said plurality of operating modes of said apparatus has one or more operating states and further comprising the step of assigning to one of said plurality of keys a function when said apparatus is in said one or more operating states.

18. The method of claim 17 further comprising the step of lighting said at least message in that one of said plurality of dedicated segment displays associated with that one of said plurality of keys which has an assigned function when said apparatus is in said one or operating states when said apparatus is in said one or more operating states.

19. The method of claim 17 further comprising the step of adding an additional lightable message which is lit when said apparatus is in said one or more operating states to that one of said plurality of dedicated sequent displays associated with that one of said plurality of keys which hat an assigned function when said apparatus is in said one or operating states.

* * * * *